United States Patent [19]

Hanabusa

[11] Patent Number: 4,904,284

[45] Date of Patent: Feb. 27, 1990

[54] CENTRIFUGAL TYPE GAS-LIQUID SEPARATOR

[75] Inventor: Osamu Hanabusa, Nagoya, Japan

[73] Assignee: Mitsubishi Jukogyo Kabushiki Kaisha, Tokyo, Japan

[21] Appl. No.: 307,287

[22] Filed: Feb. 7, 1989

[30] Foreign Application Priority Data

Feb. 16, 1988 [JP] Japan .................................. 63-31799

[51] Int. Cl.$^4$ ............................................. B01D 19/00
[52] U.S. Cl. ........................................ 55/165; 55/159; 55/203; 494/56
[58] Field of Search ...................... 55/1, 159, 165, 168, 55/199–203, 162; 494/43, 56, 60

[56] References Cited

U.S. PATENT DOCUMENTS

| | | | |
|---|---|---|---|
| 3,486,302 | 12/1969 | Paynter | 55/159 |
| 3,559,879 | 2/1971 | Bechard | 494/56 X |
| 3,828,524 | 8/1974 | Booth et al. | 55/159 X |
| 4,113,452 | 9/1978 | Brown et al. | 55/203 |

Primary Examiner—Charles Hart
Attorney, Agent, or Firm—Wenderoth, Lind & Ponack

[57] ABSTRACT

An improved centrifugal type gas-liquid separator is composed of a rotatable hollow disc-shaped gas-liquid separation chamber having a separated liquid outlet on its outer circumferential surface, a housing surrounding the gas-liquid separation chamber liquid-tightly outside thereof so as not to restrain its rotation and liquid-tightly defining a reservoir chamber of separated liquid between the inner circumference of its outer portion and the outer circumference of the gas-liquid separation chamber. A separated liquid extraction port enables the separated liquid to be extracted continuously from the reservoir chamber of the housing. Tubular rotary shafts are inserted in the proximity of the rotary center axis of the gas-liquid separation chamber along the rotary center axis from the opposite sides of the housing. Gas-liquid mixture fluid is fed into the gas-liquid separation chamber through one of the tubular rotary shafts, and the separated gas is ejected through the other tubular rotary shaft. A device is actuated by the separated liquid within the disc-shaped gas-liquid separation chamber for extracting the separated liquid through the separated liquid outlet on the outer circumference of the gas-liquid separation chamber.

5 Claims, 1 Drawing Sheet

CENTRIFUGAL TYPE GAS-LIQUID SEPARATOR

BACKGROUND OF THE INVENTION:

1. Field of the Invention

The present invention relates to a centrifugal type gas-liquid separator, and more particularly to a centrifugal type gas-liquid separator which can reliably separate and extract gas and liquid from gas-liquid mixture fluid in a gravity-free environment or a minute-gravity environment such as cosmic space.

2. Description of the Prior Art

Within a minute-gravity environment in cosmic space, a mixture of liquid such as, for example, water and gas such as, for example, air cannot be separated easily by relying upon difference in a specific gravity as is the case with separation on the earth. When human beings live or conduct scientific experiments within a minute-gravity environment, there is a necessity of utilizing and reclaiming water or other liquids, and in a plant or a system for handling these liquids, when the liquids coexist with gases such as air, nitrogen hydrogen, oxygen, methane, etc. will occur situations where a gas-liquid separating operation is necessitated.

Heretofore, as gas-liquid separating devices under minute-gravity conditions, centrifugal separator means and membrane separator means have been proposed.

However, with such prior art gas-liquid separators the following problems remain to be resolved:

(1) In some cases, separation of gas from liquid could not be effected reliably.

(2) In a centrifugal type gas-liquid separator, in the event that a centrifugal force is not present, leakage of gas and liquid, especially of gas, could not be prevented.

SUMMARY OF THE INVENTION

It is therefore one object of the present invention to provide an improved centrifugal type gas-liquid separator which can reliably achieve separation and extraction of gas and liquid from gas-liquid mixture fluid even under a gravity-free state or a minute-gravity state without leakage of gas or liquid to the surrounding environment.

Another object of the present invention is to provide an improved centrifugal type gas-liquid separator, in which leakage of gas or liquid to the environment does not occur even under a non-centrifugal-force condition.

According to one feature of the present invention, there is provided a centrifugal type gas-liquid separator comprising a rotatable hollow disc-shaped gas-liquid separation chamber having a separated liquid outlet on its outer circumferential surface, a housing surrounding the gas-liquid separation chamber liquid-tightly outside thereof so as not to restrain its location and liquid-tightly defining a reservoir chamber for separated liquid between the inner circumference of its outer portion and the outer circumference of the aforementioned gas-liquid separation chamber, a separated liquid extraction port through which the separated liquid can be extracted continuously from the aforementioned reservoir chamber of the housing, tubular rotary shafts inserted in the proximity of the rotary center axis of the gas-liquid separation chamber along the rotary center axis from the opposite sides for feeding gas-liquid mixture fluid into the gas-liquid separation chamber through one of the tubular rotary shafts and for ejecting the separated gas through the other tubular rotary shaft, and means actuated by the separated liquid within the disc-shaped gas-liquid separation chamber for extracting the separated liquid through the separated liquid outlet on the outer circumference of the gas-liquid separation chamber.

The centrifugal type gas-liquid separator according to the present invention operates in the following manner due to the above-described construction. That is, when the gas-liquid separation chamber is rotated while gas-liquid mixture fluid is being fed through one of the tubular rotary shafts, the gas-liquid mixture fluid is separated into liquid and gas due to a centrifugal force then generated, the separated liquid is ejected into the reservoir chamber through the separated liquid outlet, and then it is extracted continuously from the reservoir chamber through the separated liquid extraction port. The separated gas is extracted through the other tubular rotary shaft.

According to the present invention, owing to the above-mentioned construction and operation, gas and liquid can be perfectly separated from gas-liquid mixture fluid and they can be collected without leakage to the environmental space such as cosmic space. Moreover, there is provided a small-sized light-weight gas-liquid separator that has excellent handling and economy characteristics. Furthermore, according to an additional feature of the present invention, there is provided a centrifugal type gas-liquid separator wherein gas will not leak out to the environment even under a gravity-free and non-centrifugal-force condition.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENTS:

A number of preferred embodiments of the present invention now will be described with reference to the accompanying drawings. However, with regard to the portions of the centrifugal type gas-liquid separator that one common to the respective preferred embodiments, that is, those portions of the centrifugal type gas-liquid separator other than means actuated by separated liquid in a gas-liquid separation chamber for extracting the separated liquid through a separated liquid extraction port of the gas-liquid separation chamber (which means is not shown in FIG. 1), description will be made with reference to FIG. 1.

Figure 1:
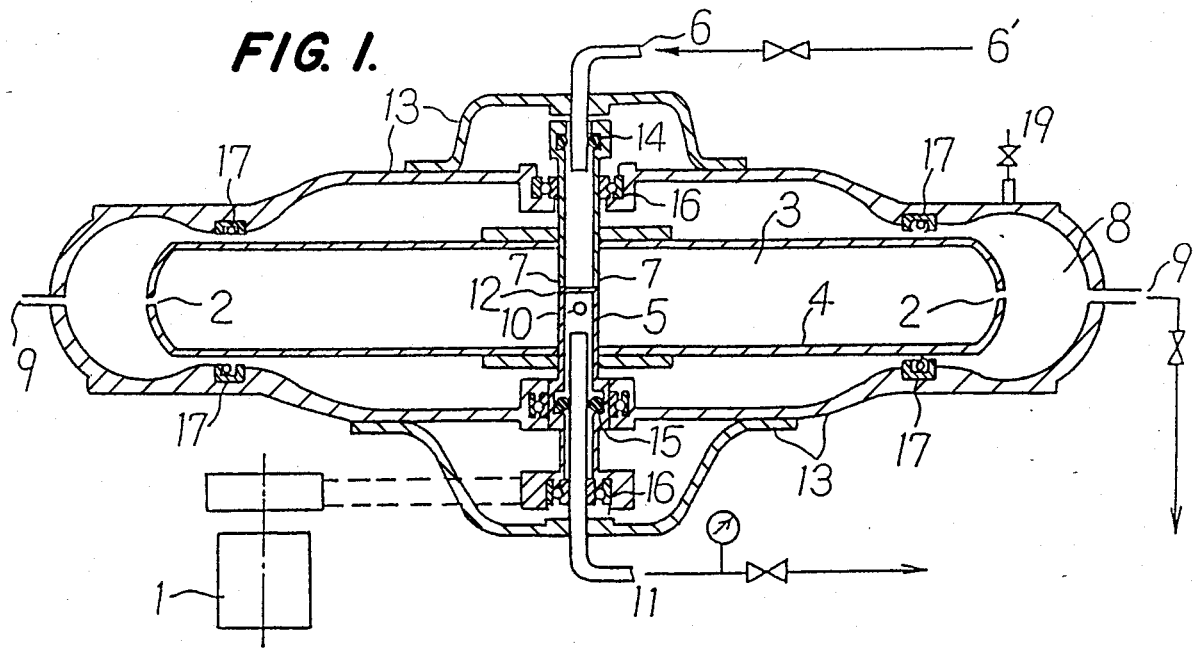
FIG. 1 is a longitudinal cross-sectional view of a centrifugal type gas-liquid separator incorporating the present invention and shown with a portion of a means for extracting separated liquid removed.

In FIG. 1, a torque is applied from a driving device 1 to a tubular rotary shaft 5 penetrating through the center of a hollow disc 4 having a plurality of separrated liquid outlets 2 on its outer circumferential surface and defining a gas separation chamber 3 therein. Shaft 5 is rigidly secured to the hollow disc 4, and thereby the hollow disc 4 is rotated. When gas-liquid mixture fluid is fed through a pipe 6' it is injected into a separation chamber 3 through holes 7 drilled in the tubular rotary shaft 5, and within the hollow disc 4 the gas-liquid mixture fluid is subjected to a centrifugal separating action, so that the liquid having a relatively large specific gravity is sputtered to and accumulated at the outer circumferential portion of the hollow disc 4, and moves to a separated liquid reservoir 8 through the separated liquid outlets 2, such separated liquid can be extracted as liquid not containing gas bubbles through a separated liquid extraction port 9. The gas separated in the gas-liquid separation chamber 3 placed under artificial rotational gravity stagnates in the proximity of the tubular rotary shaft 5, and it is discharged or recovered via gas outlets 10 drilled in the tubular rotary shaft 5 and through a gas extraction pipe 11 while compensating for a pressure variation in the gas-liquid separation chamber 3 that is dependent upon the feed rate of the gas-liquid mixture fluid and the flow rate of the separated and extracted liquid.

The interior of the tubular rotary shaft 5 is divided by a partition wall 12 so that the fed gas-liquid mixture fluid will not mix with the gas after separation. Into one end of the tubular rotary shaft 5 is inserted a tip end 6 of feed pipe 6' fixed to a housing 13, and leakage of the gas-liquid mixture fluid is prevented by an O-ring 14. Into the other end of the tubular rotary shaft 5 is inserted the gas extraction pipe 11 and sealing therebetween is achieved by an O-ring 15. The tubular rotary shaft 5 is fitted in and held by a plurality of bearings 16, that can withstand high-speed rotation with shaft 5 accompanied by the hollow disc 4, at the central portion of the housing 13 which is fixedly mounted on a table or the like.

On the inner surfaces of the housing 13 are disposed lip seals 17, e.g. fitting into grooves, for the purpose of preventing the separated liquid from leaking from the separated liquid reservoir 8 by being pressed against confronting outer peripheral surfaces of the hollow disc 4. To the separated liquid reservoir 8 is connected a port 19 for removal of air from the reservoir chamber before commencement of a separation operation.

Figure 2A:
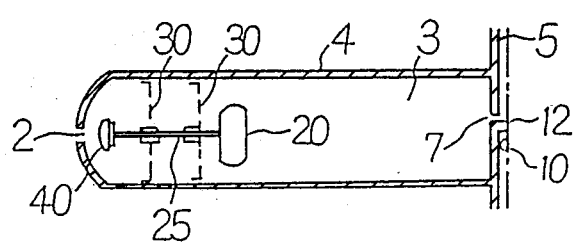
FIGS. 2(A) to 2(E2) are schematic longitudinal cross-sectional views showing portions of one side of each of respective hollow disc-shaped gas-liquid separation chambers according to first to fifth preferred embodiments of the present invention, FIG. 2(A) showing a first preferred embodiment, FIG. 2(B) showing a second preferred embodiment, FIG. 2(C) showing a third preferred embodiment, FIG. 2(D) showing a fourth preferred embodiment, and FIGS. 2(E1) and 2(E2) showing a fifth preferred embodiment, more particularly, FIG. 2(E1) showing a non-centrifugal-force condition, and FIG. 2(E2) showing the case where a centrifugal force is present and a gas-liquid mixture fluid contains liquid.
Figure 2C:
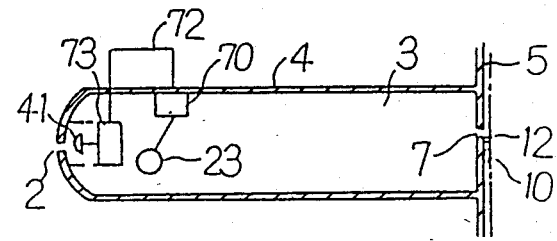
Figure 2B:
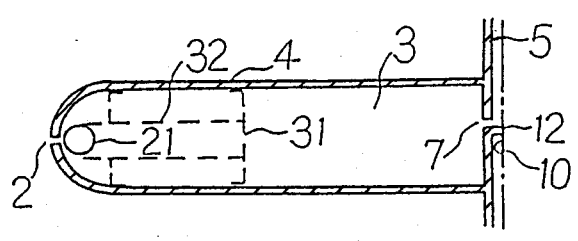
Figure 2D:
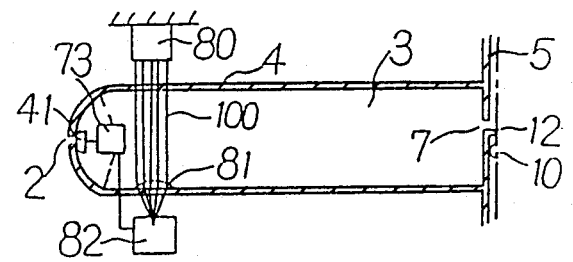
Figure 2:
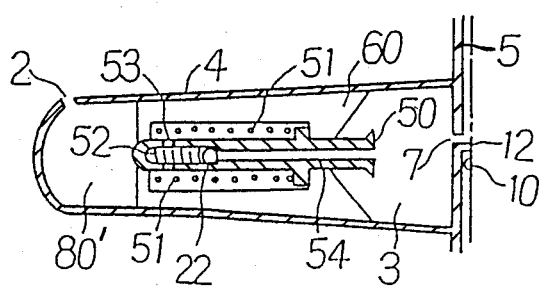
Figure 2:
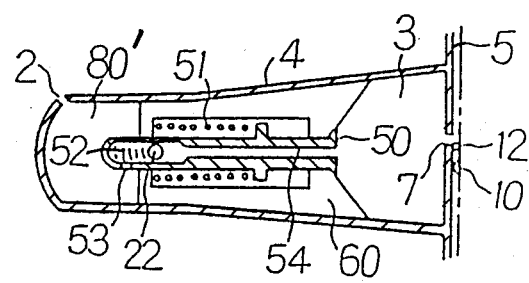

FIGS. 2(A)–2(E2) show first to fifth preferred embodiments of the present invention, and specifically respective devices actuated by the separated liquid in the gas-liquid separation chamber 3 within the aforementioned hollow disc 4 for extracting the separated liquid through the separated liquid outlet of the gas-liquid separation chamber. FIG. 2(A) shows a first preferred embodiment, in which holders 30 formed of wire nets or perforated plates are fixedly secured to the inner surface of the gas-liquid separation chamber 3. A float shaft 25, having secured to opposite ends thereof, a float 20 and a valve 40 adapted to be pressed against the separated liquid outlet 2 to stop outflow of separated liquid therethrough, penetrates through central portions of the holders 30 in a freely slidable manner. When the hollow disc 4 rotates and the gas-liquid mixture fluid is fed into the gas-liquid separation chamber 3 through the drilled holes 7 in the tubular rotary shaft 5, in the case of fed fluid containing no liquid at all, the float 20, the float shaft 25 and the valve 40 are moved outwardly jointly by centrifugual force, the valve 40 comes into press contact with the separated liquid outlet 2, and the separated gas flows out through the separated gas outlets 10 drilled in the tubular rotary shaft 5. In the case where liquid is contained in the fed gas-liquid mixture fluid, liquid will accumulate an area surrounding the valve 40, that is in an annular space concentric with the axis of the tubular rotary shaft 5 and the valve 40 is immersed in the liquid. But the valve 40 continuously is held in a press contact with outlet 2, and outflow of the liquid will not occur. However, if further liquid accumulates, the float shaft 25 and the float 20 are successively immersed in the liquid. The buoyancy of the float 20 and the total weight of the float 20, the float shaft 25 and the valve 40 are regulated in such manner that under the given centrifugal force condition (an artificial gravity condition) the entire assembly will float when the float 20 has become partly immersed under the liquid surface. As a result of such floating of the float 20 the valve 40 is separated from the separated liquid outlet 2 for the first time, and outflow of the separated liquid will start. As described above, according to this preferred embodiment, with variation of the mixing proportion as well as of the feed rate of the gas-liquid mixture fluid, only liquid will be allowed to out through the separated liquid outlet 2.

FIG. 2(B) shows a second preferred embodiment of the present invention, in which a float 21 serving also as a valve is loosely placed within a space defined by a float holder made of a perforated plate 31 or the like and fixedly secured to disc 4 in the gas-liquid separation chamber 3 and of a cylinder 32 made of perforated plate material for restricting the movable range of the float 21. In operation when only gas is fed to rotating hollow disc 4, the float 21 acts as a valve held in press contact with the separated liquid outlet. However, when a gas-liquid mixture fluid containing liquid is fed the float 21 floats up to the liquid surface and is spaced from outlet 2, and only the liquid will flow out through the separated liquid outlet 2.

FIG. 2(C) shows a third preferred embodiment of the present invention, in which a float 23 associated with an arm for actuating a float switch 70 is disposed within the gas-liquid separation chamber 3, so that the float 23 and the arm will move in accordance with the amount of liquid accumulated within the gas-liquid separation chamber 3. The float switch 70 actuated by the arm of the float 23 opens and closes an electric circuit via lead wires 72 so as to actuate an electromagnetic uniti 73 to move a valve 41 thereof to open and close outlet 2 and thereby outflow of the separated liquid is controlled.

FIG. 2(D) shows a fourth preferred embodiment of the present invention, which is constructed so as to control a valve 41 with the aid of optical means. More particularly, light flux 100 emitted from a light source 80 disposed outside of a transparent hollow disc 4 penetrates through the transparent disc 4 and is received by a light receiver 82 on the opposite side as focused light or dispersed light via a lens 81 formed on the inner surface of a transparent gas-liquid separation chamber 3. A difference in the amount of focused light or dispensed light, when the separated liquid is present in the optical path within the rotating transparent disc 4 and when it is not present, is sensed by the light receiver 82 and converted into an electric signal, and thereby the electromagnetic unit 73 and the valve 41 are actuated so that only the separated liquid flows out through the separated liquid outlet 2.

FIGS. 2(E1) and 2(E2) show a fifth preferred embodiment, in which the interior of the hollow disc 4 is partitioned into a gas-liquid separation chamber 3 and a separated liquid chamber 80' by means of blocks 60, and on the side of the gas-liquid separation chamber 3 of the block 60 is provided a piston 50 which performs a stroke or sliding motion as a result of a centrifugal force. The piston 50 is provided with an inner bore 54, a ball valve 22, a spring 52 for supporting the ball valve 22 and a separated liquid outlet 53. In addition, in the block 60 is assembled a spring 51 for holding the piston 50 in the state shown in FIG. 2(E1) when a centrifugal force is not present. A plurality of the blocks 60 are disposed about the tubular rotary shaft 5 in a well-balanced condition. When a centrifugal force acts as a result of rotation of the hollow disc 4 and liquid is not present in the gas-liquid separation chamber 3, the piston 50 moves outwardly under a condition where the ball valve 22 blocks the piston inner bore 54 under the spring force of the spring 52. When liquid is present in the gas-liquid separation chamber 3, the balance between the ball valve 22 and the spring 52 acting against the ball valve 22 is broken by the additional centrifugal weight due to the liquid, and hence the ball valve 22 leaves the valve seat as shown in FIG. 2(E2). Thus, the liquid existing in the gas-liquid separation chamber 3 and the piston inner bore 54 will pass around the ball valve 22 and will flow into the separated liquid chamber 80' through the separated liquid outlet 53. According to this preferred embodiment, regardless of whether or not the hollow disc 4 is rotating the gas will not leak out through the separated liquid outlet 2 to the outside.

In the case where the separator is operated on the earth, i.e., in a gravity environment, in the above-described first to fourth preferred embodiment, unless a centrifugal force always is applied, i.e., even when a gas-liquid mixture fluid is not fed, gas will leak out through the separated liquid outlet 2. However, in the fifth preferred embodiment such anxiety is not present as described above, so that a centrifugal force need be applied only when gas-liquid mixture fluid is fed. Thus, the fifth preferred embodiment has an aspect that is advantageous for operation of a gas-liquid separator. For instance, even within a minute gravity environment in cosmic space or even under variation of the magnitude of gravity upon carrying the separator apparatus from the earth to space, the fifth preferred embodiment can maintain the capability that always only liquid is ejected from the separated liquid outlet 2 and only gas is ejected from the gas extracton pipe 11.

It is to be noted that upon commencement of operation of the gas-liquid separator according to the first to fifth preferred embodiments on the earth, it is necessary to perform deaeration of the separated liquid reservoir 8, and in such case, deaeration is effected by opening the port 19.

As will be obvious from the detailed description above, owing to the above-mentioned structural features, the present invention can provide the following advantages:

(1) Gas and liquid can be perfectly separated from gas-liquid mixture fluid, and they can be collected without leakage to on environment space such as cosmic space.

(2) There is provided a small-sized light-weight gas-liquid separator that has excellent handling and economy.

(3) By providing, for example, a spring and a piston as used in the fifth preferred embodiment within the hollow disc-shaped gas-liquid separation chamber, there is provided a centrifugal type gas-liquid separator from which gas will not leak out to the environment even under a gravity-free or non-centrifugal-force condition.

While the principle of the present invention has been described above in connection with a number of preferred embodiments of the invention, it is a matter of course that the present invention should not be limited to the illustrated embodiments, but that many changes and modifications can be made thereto without departing from the spirit of the present invention.

What is claimed is:

1. A centrifugal type gas-liquid separator comprising:
    a rotatable hollow disc-shaped gas-liquid separation chamber having a separated liquid outlet on its outer circumferential surface,
    a housing surrounding said gas-liquid separation chamber liquid-tightly outside thereof so as not to restrain its rotation and liquid-tightly defining a reservoir chamber for separated liquid between the inner circumference of its outer portion and the outer circumference of said gas-liquid separation chamber,
    a separated liquid extraction port through which separated liquid can be extracted continuously from said reservoir chamber of said housing,
    tubular rotary shafts inserted at the proximity of the rotary center axis of said gas-liquid separation chamber along said rotary center axis from opposite sides of said separation chamber for feeding gas-liquid mixture fluid into siad gas-liquid separation chamber through one of said tubular rotary shafts and for ejecting separated gas through the other said tubular totary shaft, and
    means actuated by separated liquid within said disc-shaped gas-liquid separation chamber for extracting the separated liquid through said separated liquid outlet on the outer circumference of said gas-liquid separation chamber.

2. A centrifugal type gas-liquid separator as claimed in claim 1, wherein said means for extracting the separated liquid comprises a float and an opening/closing valve for said separated liquid outlet disposed within said gas-liquid separation chamber.

3. A centrifugal type gas-liquid separator as claimed in claim 1, wherein said means for extracting the separated liquid comprises an opening/closing float valve for said separated liquid outlet disposed within said gas-liquid separation chamber.

4. A centrifugal type gas-liquid separator as claimed in claim 1, wherein said means for extracting the separated liquid comprises a means disposed within said gas-liquid separation chamber for detecting the separated liquid within said separation chamber and a valve actuated by said detecting means for opening said separated liquid outlet.

5. A centrifugal type gas-liquid separator as claimed in claim 1, wherein said means for extracting the separated liquid comprises a piston provided within a block partitioning said hollow disc-shaped gas-liquid separation chamber from a separated liquid chamber outside thereof and having an inner bore connecting both said chambers, and a valve disposed within an inner bore of said piston and actuated by the separated liquid within said gas-liquid separation chamber for opening said inner bore of said piston.

* * * * *